(12) United States Patent
Kim et al.

(10) Patent No.: US 7,729,706 B2
(45) Date of Patent: Jun. 1, 2010

(54) LOCATION SERVICE-PROVIDING SYSTEM AND DEFERRED LOCATION REQUEST SERVICE-PROVIDING METHOD USING PREVIOUSLY COMPUTED LOCATION IN LOCATION SERVICE-PROVIDING SYSTEM

(75) Inventors: Joo-Young Kim, Suwon-si (KR); Wuk Kim, Gwacheon-si (KR); Eun-O Lee, Cheonan-si (KR)

(73) Assignee: Samsung Electronics Co., Ltd (KR)

( * ) Notice: Subject to any disclaimer, the term of this patent is extended or adjusted under 35 U.S.C. 154(b) by 535 days.

(21) Appl. No.: 11/545,242

(22) Filed: Oct. 10, 2006

(65) Prior Publication Data

US 2007/0082681 A1    Apr. 12, 2007

(51) Int. Cl.
*H04W 24/00*   (2009.01)
*H04W 4/00*    (2009.01)
(52) U.S. Cl. .................... 455/456.1; 455/433
(58) Field of Classification Search ............. 455/456.1, 455/456.2
See application file for complete search history.

(56) References Cited

U.S. PATENT DOCUMENTS

| 2004/0012722 | A1  | 1/2004 | Alvarez |
| 2004/0102198 | A1* | 5/2004 | Diener et al. ............. 455/456.1 |
| 2004/0127229 | A1* | 7/2004 | Ishii ........................ 455/456.1 |
| 2005/0153706 | A1  | 7/2005 | Niemenmaa et al. |

FOREIGN PATENT DOCUMENTS

| JP | 2007-518327 | 7/2007 |
| JP | 2008-547263 | 12/2008 |
| JP | 2009-505480 | 2/2009 |
| RU | 2 193 286 | 12/1999 |
| TW | 396701 | 7/2000 |
| TW | 200421887 | 10/2004 |
| WO | WO 2004/071127 | 8/2004 |
| WO | WO 2005/069671 | 7/2005 |
| WO | WO 2005/079002 | 8/2005 |
| WO | WO 2007/018408 | 2/2007 |
| WO | WO 2007/18409 | 2/2007 |

OTHER PUBLICATIONS

3rd Generation Partnership Project 2 "3GPP2", IP-Based Location Services, Jun. 30, 2005.
Open Mobile Alliance, "Secure User Plane Location Architecture", Apr. 19, 2005.

* cited by examiner

*Primary Examiner*—Nghi H Ly
*Assistant Examiner*—Joseph Dean, Jr.
(74) *Attorney, Agent, or Firm*—The Farrell Law Firm, LLP (57) ABSTRACT

A location service-providing system and a method for providing a deferred location request service by using previously computed position estimates. In the system and the method, if an H-SLP transmits an SUPL INIT message including location information to a target SUPL Enabled Terminal (SET) according to a location service request from an SUPL AGENT, the location information including at least one of a previous position estimate and previous assistant data, the target SET receives the SUPL INIT message, determines whether it is possible to provide the location service by reusing at least one of the location information in the SUPL INIT message and previously stored location information, when it is possible, determining position information by reusing at least one of the location information in the SUPL INIT message and the previously stored location information, and providing the SUPL AGENT with the position information.

27 Claims, 8 Drawing Sheets

LOCATION SERVICE-PROVIDING SYSTEM AND DEFERRED LOCATION REQUEST SERVICE-PROVIDING METHOD USING PREVIOUSLY COMPUTED LOCATION IN LOCATION SERVICE-PROVIDING SYSTEM

PRIORITY

This application claims priority under 35 U.S.C. §119 to applications filed in the Korean Intellectual Property Office on Oct. 10, 2005 and assigned Ser. No. 2005-95168, on Jan. 19, 2006 and assigned Ser. No. 2006-6028, and on Apr. 28, 2006 and assigned Ser. No. 2006-39047, the contents of which are incorporated herein by reference.

BACKGROUND OF THE INVENTION

1. Field of the Invention

The present invention generally relates to a system and a method for providing a location service, and more particularly to a system and a method for providing a location service that can provide a deferred location request service.

2. Description of the Related Art

With the increase in demand for various location-related services based on location, various location services using the location of a mobile terminal are being provided and development for the expansion of location services is being accomplished. The expansion of location services will be the basis of a 4G communication service.

Recently, a deferred location request service or a triggered location request service is being provided as a location service. A deferred location request service refers to a service for establishing preset criteria, periodically or non-periodically computing the position estimates of a Secure User Plane Location (SUPL) Enabled Terminal (SET), and providing an SUPL AGENT with occurrence of a corresponding event when the position estimates of the SET satisfies the preset criteria.

Figure 1:
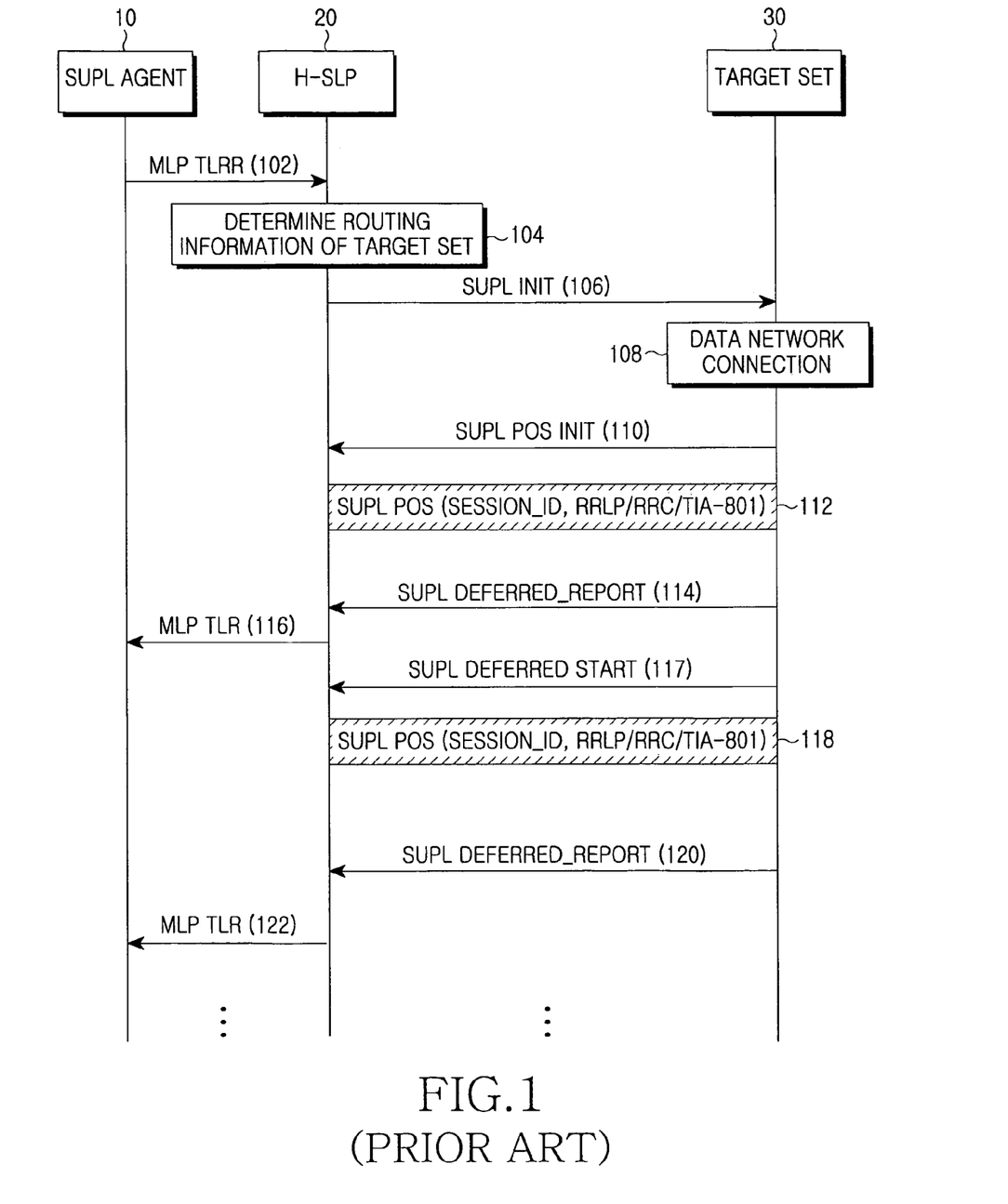
FIG. 1 is a ladder diagram illustrating a method for providing a deferred location request service according to the prior art.

A conventional method for providing deferred location request service information will be described with reference to FIG. 1 illustrating a method for providing a deferred location request service according to the prior art. A SUPL AGENT 10 transmits a Mobile Location Protocol Triggered Location Reporting Request (MLP TLRR) message, thereby requesting a Home-SUPL Location Platform (H-SLP) 20 to provide a deferred location request service in step 102.

If the MLP TLRR message is received from the SUPL AGENT 10, the H-SLP 20 determines the routing information of a corresponding target SET 30 in step 104. That is, the H-SLP 20 determines if the target SET 30 is in a roaming state and uses a SUPL.

If the target SET 30 is not in a roaming state and uses the SUPL, i.e. a location service, the H-SLP 20 transmits a SUPL Initiation (INIT) message to the target SET 30 and starts the deferred location request service in step 106. The SUPL INIT message includes a SESSION_ID, which is an identification (ID) for identifying message exchanges between the H-SLP 20 and the target SET 30, a Position (POS) method representing a positioning method, and criteria used for determining if an event has occurred.

If the SUPL INIT message is received from the H-SLP 20, the target SET 30 determines if the target SET 30 is currently connected to a packet data network in step 108. If the target SET 30 is not currently connected to the packet data network, the target SET 30 attempts a connection to the packet data network.

After performing a network connection with the H-SLP 20, the target SET 30 transmits a SUPL POS INIT message to the H-SLP 20 in step 110. The SUPL POS INIT message includes a SESSION_ID, which is an ID for identifying message exchanges between the H-SLP 20 and the target SET 30, a LOCATION_ID representing information about a network including the target SET 30, a NETWORK_ID, a SYSTEM_ID, and a SET_CAPABILITY representing positioning capability.

If the SUPL POS INIT message is received from the target SET 30, the H-SLP 20 compares the SET_CAPABILITY included in the SUPL POS INIT message with its own location measurement capability, thereby determining a POS METHOD. Further, the H-SLP 20 and the target SET 30 perform positioning according to the determined POS method in step 112.

After performing the positioning, the target SET 30 compares its own position estimates with the event occurrence criteria included in the SUPL INIT message, and determines if an event requested by the SUPL AGENT 10 has occurred. As a result of the determination, if the event has occurred, the target SET 30 reports the occurrence of the event to the H-SLP 20 by using a SUPL DEFERRED_REPORT message in step 114. The SUPL DEFERRED_REPORT message includes a SESSION_ID, a CLIENT_ID, and a POS_ESTIMATE representing the computed position estimates of the target SET 30.

If the SUPL DEFERRED_REPORT message is received from the target SET 30, the H-SLP 20 reports the occurrence of the event to the SUPL AGENT 10 by using an MLP Triggered Location Report (TLR) message in step 116. The MLP TLR message includes a REQ_ID for identifying the deferred location request service, and a TLR_POS representing the computed position estimates of the target SET 30.

After reporting the occurrence of the event, if the deferred location request service is being provided, the target SET 30 transmits a SUPL DEFERRED START message for subsequent positioning to the H-SLP 20 by using the event occurrence criteria included in the SUPL INIT message, thereby requesting the start of a new positioning procedure in step 117.

If the SUPL DEFERRED START message is received from the target SET 30, the H-SLP 20 performs a subsequent positioning procedure of the target SET 30 in step 118. The target SET 30 compares its own position estimates with the event occurrence criteria included in the SUPL INIT message, and determines if the event requested by the SUPL AGENT 10 has occurred.

If the event has occurred, the target SET 30 reports the occurrence of the event to the H-SLP 20 by using the SUPL DEFERRED_REPORT message in step 120. If the SUPL DEFERRED_REPORT message is received from the target SET 30, the H-SLP 20 reports the occurrence of the event to the SUPL AGENT 10 by using the MLP TLR message in step 122. Further, the target SET 30 and the H-SLP 20 repeat steps 117, 118, 120 and 122 until a preset end time is reached. If the preset end time is reached, the procedure for providing the deferred location request service information is terminated.

The conventional method for providing the deferred location request service information as described above repeats a series of steps of: first computing the position estimates of a SET; comparing the computed position estimates with corresponding criteria; and determining if an event requested by a SUPL AGENT has occurred, and reporting the results of the determination.

In the conventional method as described above, since the required position estimates of a SET must be newly computed whenever the occurrence or non-occurrence of an event is determined, the whole process is complicated due to the repetitive positioning. Further, the conventional method is inefficient because the computed position estimates of the set or assistant data for computing the position estimates are used only once for determining if a corresponding event has occurred even when it can be reused for determining if a subsequent event has occurred.

SUMMARY OF THE INVENTION

Accordingly, the present invention has been made to solve the above-mentioned problems occurring in the prior art, and it is an object of the present invention to provide a system and a method for providing a location service, which can provide a deferred location request service by reusing previously computed location information even without newly computing the location information of a SET whenever the occurrence or non-occurrence of an event is determined.

It is another object of the present invention to provide a location service-providing system and a deferred location request service-providing method, which can provide a location service for a location before a time when a location service request starts by using previously computed location information.

In order to accomplish the aforementioned object, according to one aspect of the present invention, there is provided a system for providing a location service, the system including an H-SLP for transmitting an SUPL INIT message including location information to a target SET according to a location service request from an SUPL AGENT, the location information including at least one of a previous position estimate and previous assistant data; and the target SET for determining whether it is possible to provide the location service by reusing at least one of the local information in the SUPL INIT message, and at least one of previous location information previously stored if the SUPL INIT message location information, when it is possible, determining position information by reusing at least one of the location information in the SUPL INIT message and the previously stored location information, and providing the SUPL AGENT with the position information.

In order to accomplish the aforementioned object, according to another aspect of the present invention, there is provided a method for providing a deferred location request service by using location information in a location service-providing system, the method including transmitting by an H-SLP an SUPL INIT message including location information to a target SET according to a location service request from an SUPL AGENT, the location information including at least one of a previous position estimate and previous assistant data; and determining by the target SET if it is possible to reuse at least one of the location information included in the SUPL INIT message and previously stored location information; determining position information by reusing the at least one of the location information included in the SUPL INIT message and the previously stored location information, when it is possible; and providing the SUPL AGENT with the position information.

In order to accomplish the aforementioned object, according to further another aspect of the present invention, there is provided a system for providing a location service, the system including an H-SLP for transmitting an SUPL INIT message according to a location service request from an SUPL AGENT, the SUPL INIT message including location information, a QoP of location information requested by the SUPL AGENT, and criteria for the location information, the location information including at least one of a previous position estimate and previous assistant data; and the target SET for, if the SUPL INIT message is received, providing the SUPL AGENT with location information that satisfies the QoP and criteria included in the SUPL INIT message from among previously stored location information and the location information included in the SUPL INIT message.

In order to accomplish the aforementioned object, according to still another aspect of the present invention, there is provided a method by which a target SET provides a deferred location request service by using previously computed position estimates in a location service-providing system, the method including receiving an SUPL INIT message including location information of the target SET, QoP of the location information requested by a SUPL AGENT, and criteria for selecting the location information, the location information including at least one of a previous position estimate and position assistant data; and selecting usable location information which satisfies the QoP and criteria, from among the location information included in the SUPL INIT message and previously stored location information; and providing the SUPL AGENT with the selected location information.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments according to the present invention will be described with reference to the accompanying drawings. It should be noted that similar components are designated by similar reference numerals although they are illustrated in different drawings. Also, in the following description, a detailed description of known functions and configurations incorporated herein will be omitted when it may obscure the subject matter of the present invention.

Figure 2:
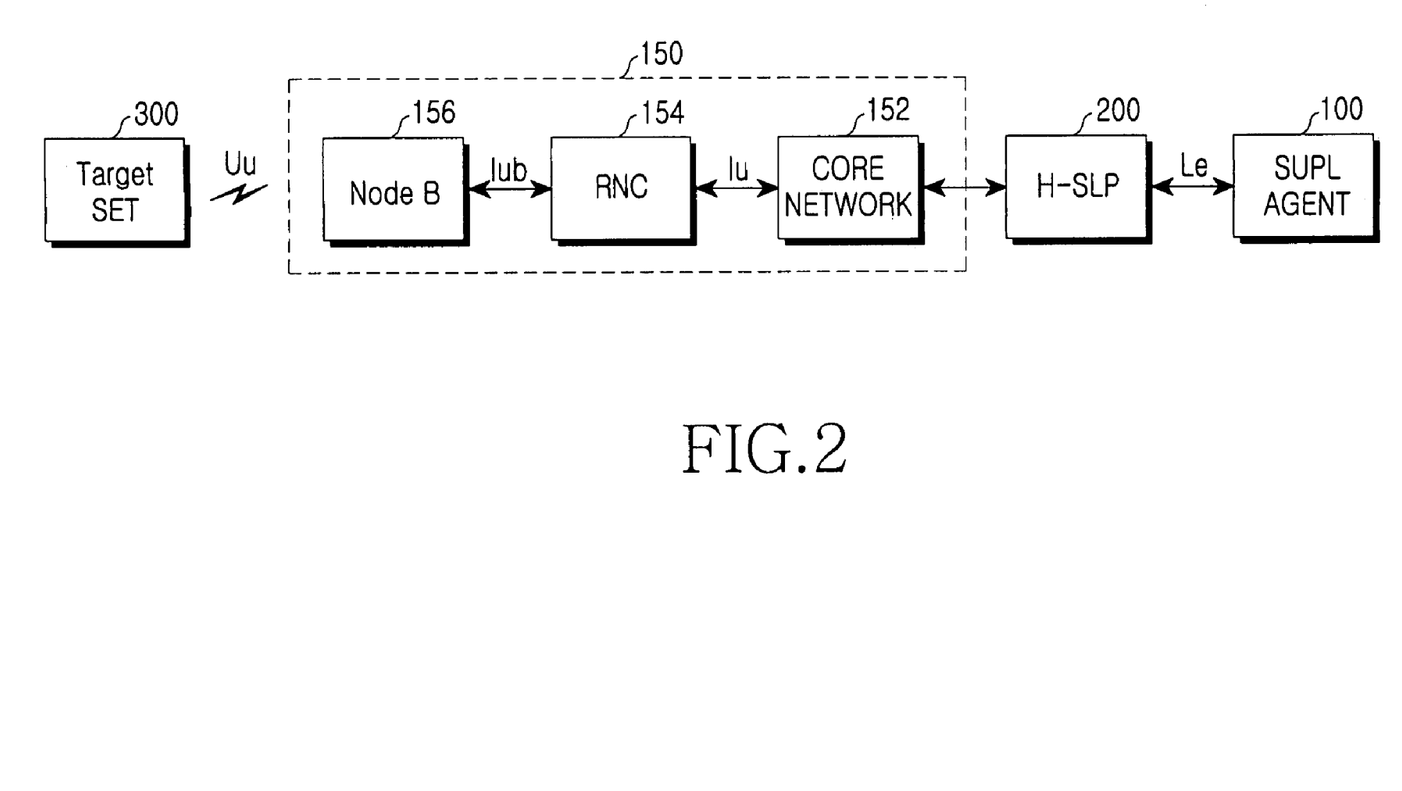
FIG. 2 is a block diagram illustrating the construction of a location service-providing system according to the present invention.

FIG. 2 shows a location service-providing system according to the present invention. The location service-providing system includes a Secure User Plane Location (SUPL) AGENT 100, a Home-SUPL Location Platform (H-SLP) 200, a target SUPL Enabled Terminal (SET) 300, and a mobile communication network 150.

The SUPL AGENT 100 corresponds to a service access pointer for accessing the H-SLP 200 supporting a SUPL in order to request the location of the target SET 300. Such a SUPL AGENT 100 may make a request for a deferred location request service or a triggered location request service. When requesting the deferred location request service or the triggered location request service, the SUPL AGENT 100 establishes items regarding when an event occurs as criteria, and transfers the criteria to the H-SLP 200. Further, when requesting previous location information, which can include position estimates, position assistant data, previous position estimates, position assistant data position estimates, previous position estimates requesting assistant data, position assistant data position, position assistant data transmission request parameters, etc., the SUPL AGENT 100 inserts criteria or conditions for the corresponding previous location information into a service request message.

The location information refers to additional information through which the target SET 300 computes its own location information. For example, when the target SET 300 computes its own location information by using a Global Positioning System (GPS), the location information may correspond to orbital information of GPS satellites suitable for the target SET 300 to receive GPS signals. The criteria or conditions for the previous location information may correspond to at least one of Quality Of Position (QoP) of the previous location information, a time period for which the previous location information have been computed by using the time stamp of the previous location information, and a positioning method used for computing the previous location information.

The H-SLP 200 computes the location information of a SET by using a SUPL according to a request for the deferred location request service from the SUPL AGENT 100. If the SUPL AGENT 100 makes a request for the deferred location request service, the H-SLP 200 inserts a parameter representing the existence of the request for the deferred location request service into a SUPL INIT message, and transmits the SUPL INIT message to the target SET 300, thereby notifying the target SET 300 of a service to be initiated. If the criteria for the previous location information are received from the SUPL AGENT 100, the H-SLP 200 transfers request criteria for the corresponding previous location information to the target SET 300. If the criteria for the previous location information sent from the SUPL AGENT 100 are not sufficient or involve additional items, the H-SLP 200 may add the request criteria for the previous location information, and then transfer the request criteria to the target SET 300.

For example, consider a situation where the SUPL AGENT 100 has requested only the previous position estimates and the H-SLP 200 requests the target SET 300 to provide previous position assistant data in order to compute the previous position estimates. This can occur because the target SET 300 may have the previously computed position assistant data instead of the previous position estimates. If the target SET 300 has the previously computed position assistant data, the H-SLP 200 may request the target SET 300 to provide the previously computed position assistant data.

If the H-SLP 200 stores the previous position assistant data of the target SET 300, the H-SLP 200 may transfer the previous position assistant data to the target SET 300. Further, the H-SLP 200 may compute the location of the target SET 300 by itself, or transfer position assistant data, i.e. Assistant GPS (A-GPS) information and orbital information of a satellite capable of communicating with the H-SLP 200, to the target SET 300, thereby allowing the target SET 300 to compute its own location. Furthermore, the H-SLP 200 stores the computed location information, and allows the previous location information to be reused according to the criteria or conditions including the QoP of the previous location information of the target SET 300 when the occurrence or non-occurrence of an event is determined.

The target SET 300 is a SET, an object of positioning, uses a SUPL protocol, and performs positioning while exchanging information necessary for location measurement with the H-SLP 200 by using a SUPL. Specifically, the target SET 300 stores the computed, and determines the reuse or non-reuse of the stored location information according to the criteria or conditions including the QoP of the previous location information when performing subsequent positioning. The target SET 300 compares the QoP of the previous location information with the QoP requested by a location service requester, e.g. the SUPL AGENT 100, or the QoP owned by the H-SLP 200 or the target SET 300, and determines the reuse or non-reuse of the previous location information currently stored in the target SET 300.

The target SET 300 may store multiple previous location information. In such a case, the target SET 300 selects one of the various previous location information according to the criteria or conditions of the previous location information sent from the location service requester, e.g. the SUPL AGENT 100, or the H-SLP 200. The criteria or conditions of the previous location information may correspond to at least one of the QoP, time stamp, time period and position method of multiple previous location information previously stored in the target SET 300.

In a case in which a SET has previous position assistant data instead of previous position estimates, when a transmission request for the previous position assistant data is received, the set performs the same condition comparison as that in a case where the previous position estimates have been requested, and selects proper previous location information.

As a result of determining the reuse or non-reuse of the previous location information previously stored in the target SET 300, if the previous location information can be reused, the H-SLP 200 or the target SET 300 determines if an event has occurred by using the previously computed location information, without computing new location information.

The present invention as described above can also be applied to a location service for providing location information when a specific event has occurred, as well as a periodic location service for periodically providing location information.

The H-SLP 200 or the target SET 300 newly computes the location of the target SET 300 when it is unable to reuse the previously computed location information of the target SET 300. The case of computing the location of the target SET 300 may be classified as a case in which the H-SLP 200 computes the location of the target SET 300, i.e. an MS-assisted method, or a case in which the target SET 300 computes its own location, i.e. an MS-based method.

When the H-SLP 200 computes the location of the target SET 300, i.e. in the case of the MS-assisted method, the target SET 300 sends network information necessary for computing its own location to the H-SLP 200. The network information may include information about a cell in which the target SET 300 is currently located, or information about a location area comprised of multiple cells. If the target SET 300 supports an A-GPS function, the target SET 300 computes a Time Difference of Arrival (TDOA) in the process of communicating with an available satellite, and sends the TDOA to the H-SLP 200.

In the case in which the target SET 300 directly computes its own location, i.e. in the case of the MS-based method, the target SET 300 receives the orbital information of a satellite capable of currently communicating with the target SET 300 from the H-SLP 200, computes the TDOA, and then computes its own by itself. If the location measurement is completed, the target SET 300 compares the event criteria received from the H-SLP 200 with the computed, thereby determining if an event has occurred. If the event has occurred, the target SET 300 reports the occurrence of the event to the H-SLP 200.

The mobile communication network 150 refers to a communication network for wireless transmission/reception between the H-SLP 200 and the target SET 300, which may include a Global System for Mobile communication (GSM) network, a Universal Mobile Telecommunication System (UMTS) network, etc. The mobile communication network 150 includes a core network 152, a Radio Network Controller (RNC) 154 and a node B 156. The core network 152 manages information of the target SETs 300, and performs a mobility management function, a session management function, and a call management function. The RNC 154 transfers data from the H-SLP 200, which is transmitted from the core network 152, to the target SET 300 through the node B 156, and transfers data received from the target SET 300 to the H-SLP 200. The node B 156 transmits/receives radio signals to/from the target SET 300.

According to the location service-providing system based on the present invention as described above, since the previously computed p location information of the target SET 300 can be reused, it is possible to eliminate an unnecessary positioning procedure and to determine through only a one-time positioning procedure if an event has occurred, which, otherwise, must be performed several times.

Hereinafter, a method for providing the deferred location request service by using the previously computed location information of the target SET 300 in the location service-providing system as described above will be described.

In the the present invention, a case in which the SUPL AGENT 100 requests the deferred location request service or the triggered location request service will be described. In such a case, the SUPL AGENT 100 presents specific criteria for the use of previous location information to the H-SLP 200, and the H-SLP 200 and the target SET 300 use the previous location information. The target SET 300 compares the previously stored location information with criteria requested by the SUPL AGENT 100. If the previously stored location information satisfy the criteria, the target SET 300 reports the occurrence of a corresponding event to the SUPL AGENT 100 (in the case of event-triggered service).

Differently from the case of event-triggered service, in the case of periodic-triggered service for periodically providing position estimates, the target SET 300 periodically transmits position estimates computed using the previous location information to the SUPL AGENT 100.

Further, in the present invention, a network-initiated case in a triggered location service will be described, including a network-initiated case in an immediate location service. A SET-initiated case also uses the previous location information corresponding to the core of the present invention. The SUPL AGENT 100 presents criteria for the previous location information, and the fact that the target SET 300 selects previous location information corresponding to the criteria can be applied to the immediate location service.

In a network-initiated case, the target SET 300 exists in an area controlled by the H-SLP 200, the H-SLP 200 computes the location of the target SET 300 at the request of the SUPL AGENT 100, and transfers the computed location information to the SUPL AGENT 100. However, the present invention can be applied to the SET-initiated case of transferring the location information of the target SET 300 to the target SET 300 according to a request for the deferred location request service from the target SET 300. Further, in the present invention, a case in which the target SET 300 determines the occurrence or non-occurrence of an event will be described. However, it goes without saying that the H-SLP 200 can also determine the occurrence or non-occurrence of an event.

Figure 3:
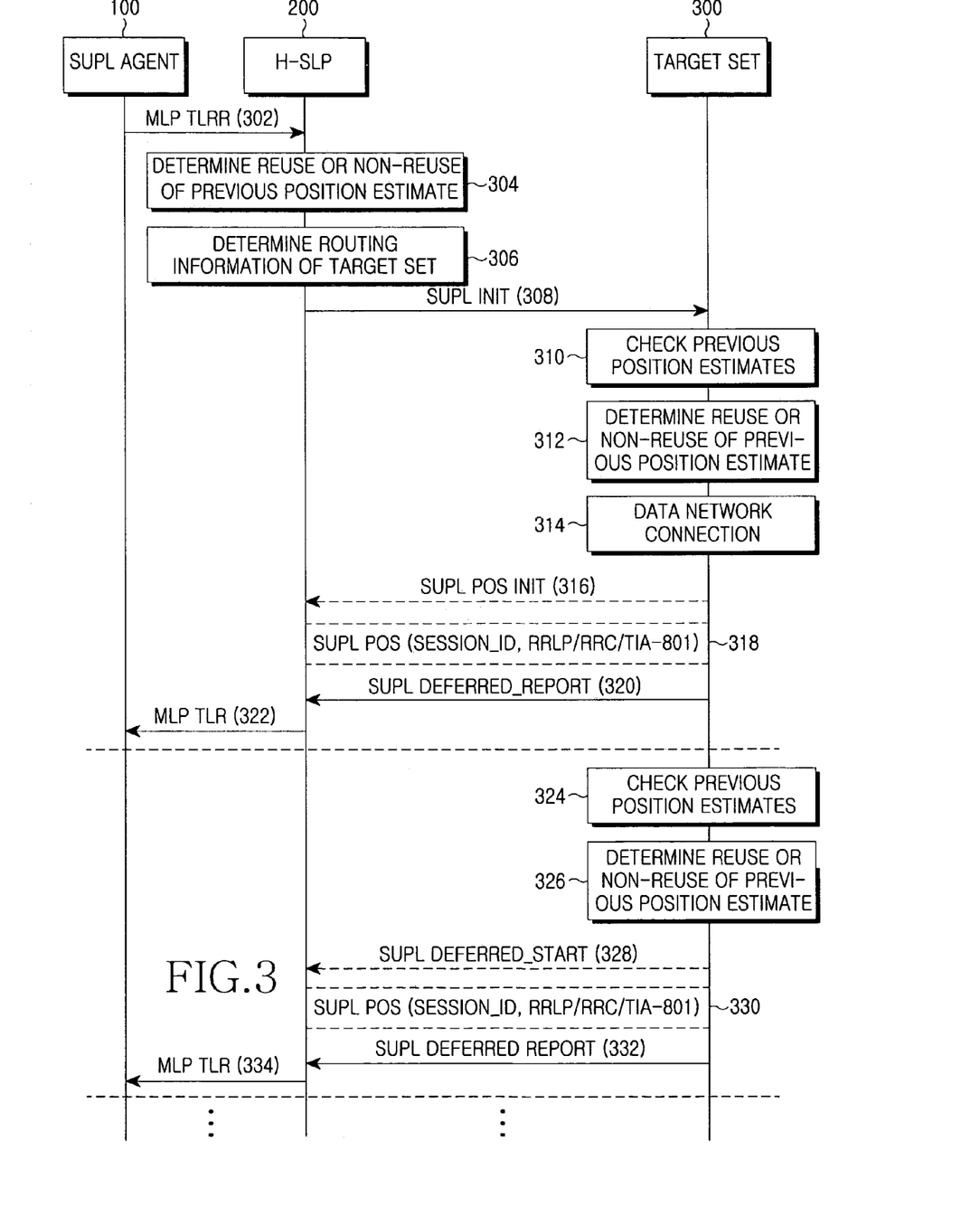
FIG. 3 is a ladder diagram illustrating a method for providing a deferred location request service by using previously computed position estimates in a location service-providing system according to the present invention.

FIG. 3 shows a method for providing the deferred location request service by using previously computed location information in the location service-providing system according to the present invention.

The SUPL AGENT 100 requests the H-SLP 200 to provide the deferred location request service or the triggered location request service by using a Mobile Location Protocol (MLP). An MLP Triggered Location Reporting Request (TLRR) message is transferred from the SUPL AGENT 100 to the H-SLP 200.

The MLP TLRR message includes parameters such as a Mobile Subscriber Identity (MSID), a CLIENT_ID, a START_TIME, a STOP_TIME, a TLRR_EVENT, a previous data mode, a previous retrieval mode and a condition of previous position. The MSID represents the unique ID of the target SET 300 (an object of positioning), the CLIENT_ID represents the unique ID of the SUPL AGENT 100, the START_TIME represents service start time, and the STOP_TIME represents service end time. The TLRR_EVENT represents a location report request event and includes a TARGET_AREA and a CHANGE_AREA_STATE. The TARGET_AREA represents a target area, and the CHANGE_AREA_STATE represents the state of a SET and includes ARRIVAL, LEAVING and STAY. The ARRIVAL represents if the target SET 300 has arrived at the target area, the LEAVING represents if the target SET 300 leaves the target area, and the STAY represents if the target SET 300 exists in the target area. The previous data mode represents if previous position estimates are requested or previous position assistant data is requested. This parameter may also be directly sent by the SUPL AGENT 100, or may be added when the H-SLP 200 sends the criteria requested by the SUPL AGENT 100 to the target SET 300.

For example, when the SUPL AGENT 100 has requested the H-SLP 200 to provide location information, the H-SLP 200 may send a message for requesting previous assistant data to the target SET 300. It is possible to indicate if the previous position estimates of the target SET 300 are requested or the previous assistant data of the target SET 300 is requested by means of the previous retrieval mode. The reason for requesting the previous position assistant data is because the H-SLP 200 may compute location information by using the position assistant data received from the target SET 300 (e.g. A-GPS SET assisted mode).

The previous retrieval mode represents if the SUPL AGENT 100 requests at least one of the previous location information of the target SET 300, or requests at least one of the current location information of the target SET 300. That is, the previous retrieval mode represents if the SUPL AGENT 100 requests only the previous position estimates of the target SET 300, only the previous position assistant data of the target SET 300, or both the previous location information of the target SET 300.

The condition of previous position represents criteria or conditions for previous location information. The criteria or conditions for the previous location information may include the QoP, time stamp and the time period of the previous location information, a position method for computing the previous location information, etc.

Figure 7:
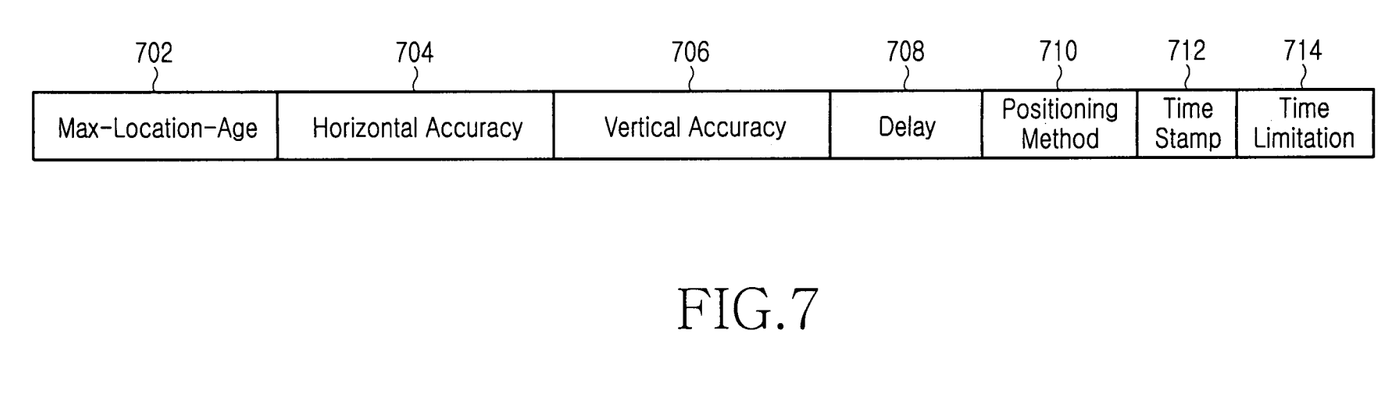
FIG. 7 is a diagram illustrating the structure of a condition of previous position in criteria for previous location information according to the present invention.

That is, the condition of previous position is a condition used for selection of previous location information. As shown in FIG. 7, this condition includes a max-location-age 702, a horizontal accuracy 704, a vertical accuracy 706, a delay 708, a positioning method 710 (protocols, a positioning method, etc., used for computing location information between a SET and an H-SLP, e.g. a SET-based mode or a SET-assisted mode, examples of a protocol: Radio Resource Location Services Protocol (RRLP), Interim Standard (IS)-801 (published by the Telecommunications Industry Association), etc.), a time stamp 712, and a time limitation 714. The time stamp 712 represents time at which previous location information are generated. The time limitation or time period 714 represents a period during which previous location information can be used.

Further, the QoP represents the accuracy of previous location information. When the SUPL AGENT 100 requests previous location information with the condition of previous position, the SUPL AGENT 100 can present the criteria or conditions, and the target SET 300 selects previous location information satisfying the corresponding criteria or conditions from stored previous location information, and transmits the selected previous location information.

If the MLR TLRR message is received from the SUPL AGENT 100, the H-SLP 200 determines if the previous location information of the target SET 300 are stored in step 304, as shown in FIG. 3. The H-SLP 200 identifies the target SET 300 by means of the MSID included in the MLR TLRR message. If the previous location information are stored, the H-SLP 200 compares the level of the QoP requested by the SUPL AGENT 100 with the condition of previous position including the QoP of previous location information, thereby determining if the previous location information can be reused. If the previous location information can be reused, the H-SLP 200 transmits the previous location information to the target SET 300.

Also, if the previous location information are stored, it goes without saying that the H-SLP 200 may also directly transmit the previous location information to the target SET 300 without condition inspection using the condition of previous position.

In step 306, the H-SLP 200 sets up the routing information of the target SET 300. That is, the H-SLP 200 determines if the target SET 300 is in a roaming state, uses the SUPL, and then sets up the routing information based on the results of the determination. In the present invention, it is assumed that the target SET 300 is not in a roaming state and can perform positioning by using the SUPL.

After setting up the routing information, the H-SLP 200 transmits the SUPL INIT message to the target SET 300, thereby starting the deferred location request service in step 308. When the H-SLP 200 has the previous and can reuse the previous location information, the H-SLP 200 inserts previous position estimates or position assistant data into the SUPL INIT message. The H-SLP 200 may also transmit the previous position estimates or position assistant data to the target SET 300 without the process of determining the reuse or non-reuse of the previous location information by means of criteria. Furthermore, when a condition exists of a previous position including the QoP requested by the SUPL AGENT 100, the H-SLP 200 may also insert the QoP into the SUPL INIT message and transmit the SUPL INIT message.

The SUPL INIT message includes a SESSION_ID, an SLP-MODE, a POS METHOD, CRITERIA, a previous data mode in which a SERVICE_TYPE is received from the SUPL AGENT 100, a previous retrieval mode, and a condition of previous position. When previous location information exist, the SUPL INIT message includes the previous location information. When the QoP requested by the SUPL AGENT 100 exists, the SUPL INIT message includes the QoP.

The SESSION_ID represents an ID for identifying message exchanges between the H-SLP 200 and the target SET 300, and the SLP-MODE represents if the H-SLP 200 is divided into a positioning server and a message management server. When the positioning server is integrated with the message management server, the SLP-MODE may be indicated by a PROXY_MODE. When the positioning server is separated from the message management server, the SLP-MODE may be indicated by a NON_PROXY_MODE. The POS METHOD represents a positioning method used when the H-SLP 200 and the target SET 300 compute position. For example, in a Global System for Mobile Communications (GSM) network, an RRLP can be used. In a Wideband Code Division Multiple Access (WCDMA) network, an RRC can be used. In a CDMA network, an IS-801, a SERVICE_TYPE (a immediate request service or a deferred request service), etc., can be used.

The criteria represent criteria for determining if an event has occurred, which are transferred from the H-SLP 200 to the target SET 300. The criteria may include parameters such as a TLRR_EVENT, an INTERVAL, a STOP_TIME and a START_TIME. The TLRR_EVENT may include a TARGET_AREA and a CHANGE_AREA_STATE. The TARGET_AREA represents a target area, and the CHANGE_AREA_STATE represents the state of a SET. The INTERVAL represents a period of a positioning procedure between the H-SLP 200 and the target SET 300. The START_TIME represents service start time and the STOP_TIME represents service end time.

If the SUPL INIT message is received from the H-SLP 200, the target SET 300 checks the previous location information in step 310. The previous location information may be received in the target SET 300 from the H-SLP 200 through the SUPL INIT message, or may correspond to previous location information previously stored in the target SET 300. Accordingly, the target SET 300 determines if previous location information are included in the received SUPL INIT message, and determines if the previously stored previous location information exist in the target SET 300.

In step 312, the target SET 300 determines the reuse or non-reuse of the previously previous location information. That is, if there exists previously computed previous location information, the target SET 300 selects previous location information satisfying the criteria (e.g. the QoP requested by the SUPL AGENT 100) presented from the H-SLP 200 or the SUPL AGENT 100 from the previous location information stored in the target SET 300 with reference to the condition of previous position including the QoP requested by the SUPL AGENT 100.

Herein, when the target SET 300 has both the previous location information received from the H-SLP 200 and the previous location information stored therein at the same time, the target SET 300 selects location information, which satisfy the presented criteria, i.e. the condition of previous position, on the basis of at least one of the QoPs, time stamps, time limitations and velocities of the respective location information. Then, the target SET 300 determines the reuse or non-reuse of the selected location information. In step 314, the target SET 300 attempts a data network connection. That is, the target SET 300 determines if the target SET 300 is being connected to a packet data network. If the target SET 300 is not connected to the packet data network, the target SET 300 attempts a connection to the packet data network. The target SET 300 determines a PROXY_MODE or a NON_PROXY_MODE with reference to the parameter SLP_MODE 62 included in the received SUPL INIT message. In the case of the PROXY_MODE, the target SET 300 performs a connection to the H-SLP 200 through an Internet Protocol.

After performing the connection, the target SET 300 determines the occurrence of an event by using the previous location information when the reuse of the previous location information are permitted as a result of the determination for the reuse or non-reuse of the previous location information. However, when the reuse of the previous location information are not permitted, the target SET 300 computes new location information and determines the occurrence of an event. In the present invention, a predetermined service is provided according to the results obtained by determining if an event has occurred by using the location information of a SET. However, in the case of the periodic location service, whether previous location information satisfy the condition of previous condition is determined without determining if an event has occurred, and values satisfying the condition of previous condition are transmitted to a network.

In such a case, a description will be given on an assumption that the reuse of the previous location information is permitted. When the reuse of the previous location information is permitted, steps 316 and 318 are omitted and step 320 is performed. That is, the target SET 300 determines if an event has occurred. If the event has occurred, the target SET 300 reports the occurrence of the event to the H-SLP 200. In order to report the occurrence of the event, the target SET 300 transmits a SUPL DEFERRED_REPORT message to the H-SLP 200. The SUPL DEFERRED_REPORT message includes a SESSION_ID, a CLIENT_ID and a POS_ESTIMATE. The POS_ESTIMATE represents the location information of the target SET 300, and may include the previous location information of the target SET 300.

If the SUPL DEFERRED_REPORT message is received from the target SET 300, the H-SLP 200 reports the occurrence of the event to the SUPL AGENT 100 by using an MLP TLR message in step 322. The MLP TLR message includes a REQ-ID and a TLR_POS. The REQ_ID is an ID for identifying the request for a deferred request service, and the TLR_POS represents the previous location information of the target SET 300.

However, when the reuse of the previous location information is not permitted, step 316 is performed. That is, the target SET 300 transmits a SUPL POS INIT message to the H-SLP 200. The SUPL POS INIT message includes parameters such as a SESSION_ID, a LOCATION_ID, a SET_CAPABILITY, etc. The SESSION_ID represents an ID for identifying message exchanges between the H-SLP 200 and the target SET 300. The LOCATION_ID represents information about a network including the target SET 300, cell information, NETWORK_ID information, SYSTEM_ID information, etc. The SET_CAPABILITY represents which method is to be used as a positioning method between an MS-ASSISTED A-GPS and an MS-BASED A-GPS and which protocol is to be used as a positioning protocol among an RRLP, an RRL and an IS-801.

If the SUPL POS INIT message is received from the target SET 300, the H-SLP 200 determines a positioning method to be used in a positioning procedure, and computes new location information of the target SET 300 by using the determined positioning method, in step 318. When the positioning method to be used in the positioning procedure performed by the target SET 300 or the H-SLP 200 has been predetermined, the step of determining the positioning method is omitted and the position of the target SET 300 is computed according to the predetermined positioning method.

However, when the positioning method has not been predetermined, the H-SLP 200 compares the parameter SET_CAPABILITY included in the SUPL POS INIT message with its own positioning capability, determines the positioning method to be used in the positioning procedure, and then computes new location information of the target SET 300.

After the position of the target SET 300 is newly computed, the target SET 300 determines if an event has occurred in step 320. If the event has occurred, the target SET 300 reports the occurrence of the event to the H-SLP 200. In order to report the occurrence of the event, the target SET 300 transmits the SUPL DEFERRED_REPORT message to the H-SLP 200. The SUPL DEFERRED_REPORT message includes the SESSION_ID, the CLIENT_ID and the POS_ESTIMATE. The POS_ESTIMATE represents the location information of the target SET 300, and may include the newly computed location information of the target SET 300.

If the SUPL DEFERRED_REPORT message is received from the target SET 300, the H-SLP 200 reports the occurrence of the event to the SUPL AGENT 100 by using the MLP TLR message in step 322. The MLP TLR message includes the REQ_ID and the TLR_POS. The REQ_ID is an ID for identifying the request for a deferred request service, and the TLR_POS represents the newly computed location information of the target SET 300.

After reporting the occurrence of the event according to whether the reuse of the previous location information is permitted as described above (first report), the H-SLP 200 and the target SET 300 determine if it is necessary to report the occurrence of a subsequent event. Since the target SET 300 is aware of the event occurrence criteria requested by the SUPL AGENT 100, the target SET 300 can determine if it is necessary to report the occurrence of the subsequent event, and can become aware of an order of each event report.

When it is necessary to report the occurrence of the subsequent event, the target SET 300 enters a step of reporting the occurrence of the subsequent event (second report), and checks previous location information in step 324 before determining the occurrence or non-occurrence of the subsequent event. In step 326, the target SET 300 determines the reuse or non-use of the previous location information. Since steps 324 and 326 are similar to steps 310 and 312, details refer to steps 310 and 312.

As a result of determination in step 326, when the reuse of the previous location information is permitted, the target SET 300 determines the occurrence or non-occurrence of the subsequent event by means of the previous location information. Otherwise, the target SET 300 computes new location information and determines the occurrence or non-occurrence of the subsequent event.

When the reuse of the previous location information is permitted, steps 328 and 330 are omitted and step 332 is performed. That is, the target SET 300 determines the occurrence or non-occurrence of the subsequent event. However, if the reuse of the previous location information is not permitted, steps 328 and 330 are performed. That is, the target SET 300 computes new location information and determines the occurrence or non-occurrence of the subsequent event.

The target SET 300 and the H-SLP 200 determine when the deferred location request service currently in use ends with reference to the STOP_TIME and the INTERVAL, and repeats steps 324, 326, 328, 330, 332 and 334 up to the STOP_TIME at which the deferred location request service ends.

In the method according to the present invention, when the target SET 300 or the H-SLP 200 repeatedly determines the occurrence or non-occurrence of an event, whether the previously computed location information of the target SET 300 can be reused is determined. If the previously computed location information can be reused, a new positioning procedure is omitted and the occurrence or non-occurrence of the event is determined by using the previously computed location information. Consequently, according to the method for providing the deferred location request service by using the previous location information based on the the present invention, it is possible to eliminate an unnecessary positioning procedure and to determine through only a one-time positioning procedure if an event has occurred, which, otherwise, must be performed several times.

The operation of the target SET 300 for performing the method for providing the deferred location request service by using the previous location information according to the present invention will be described in more detail with reference to FIG. 4.

In step 402, the target SET 300 determines if the SUPL INIT message is received from the H-SLP 200. The SUPL INIT message includes the SESSION_ID, the SLP-MODE, the POS METHOD, the CRITERIA, and the SERVICE_TYPE. If the previous location information exist, the SUPL INIT message includes the previous position. If the QoP requested by the SUPL AGENT 100 exists, the SUPL INIT message may also include the QoP.

If the SUPL INIT message is received, the target SET 300 checks the previous location information in step 404. The previous location information may be received in the target SET 300 from the H-SLP 200 through the SUPL INIT message, or may correspond to previous location information previously stored in the target SET 300. Accordingly, the target SET 300 determines if previous location information are included in the received SUPL INIT message, and determines if previous location information stored in the target SET 300 exist.

If the previous location information exist, the target SET 300 determines if the previous location information satisfy corresponding criteria with reference to the condition of previous position including the QoP requested by the SUPL AGENT 100, in step 406. When a SET has multiple location information, or when the set has values exceeding the requested number of values, whether the multiple location information satisfy the condition of previous position, i.e. the criteria proposed from the SUPL AGENT 100 or the H-SLP 200, is determined. If some of the location information satisfy the condition of previous position, the target SET 300 selects the location information satisfying the criteria and permits the reuse of the selected location information. In step 410, the target SET 300 determines the occurrence or non-occurrence of an event according to the location information. If the event has occurred, the target SET 300 reports the occurrence of the event.

In the meantime, if previous location information do not exist, or if existing previous location information do not satisfy the condition of previous position, the target SET 300 performs new positioning in step 412.

In such a case, the target SET 300 determines if a positioning method is predetermined in step 412. If the predetermined positioning method exists, the target SET 300 computes new position estimates according to the predetermined positioning method in step 414. However, if the predetermined positioning method does not exist, the target SET 300 determines a positioning method for computing new position estimates in step 418, and computes new position estimates according to the newly determined positioning method in step 420. In step 416, the target SET 300 determines the occurrence or non-occurrence of an event according to the newly computed location information of a SET. If the event has occurred, the target SET 300 reports the occurrence of the event.

Figure 4:
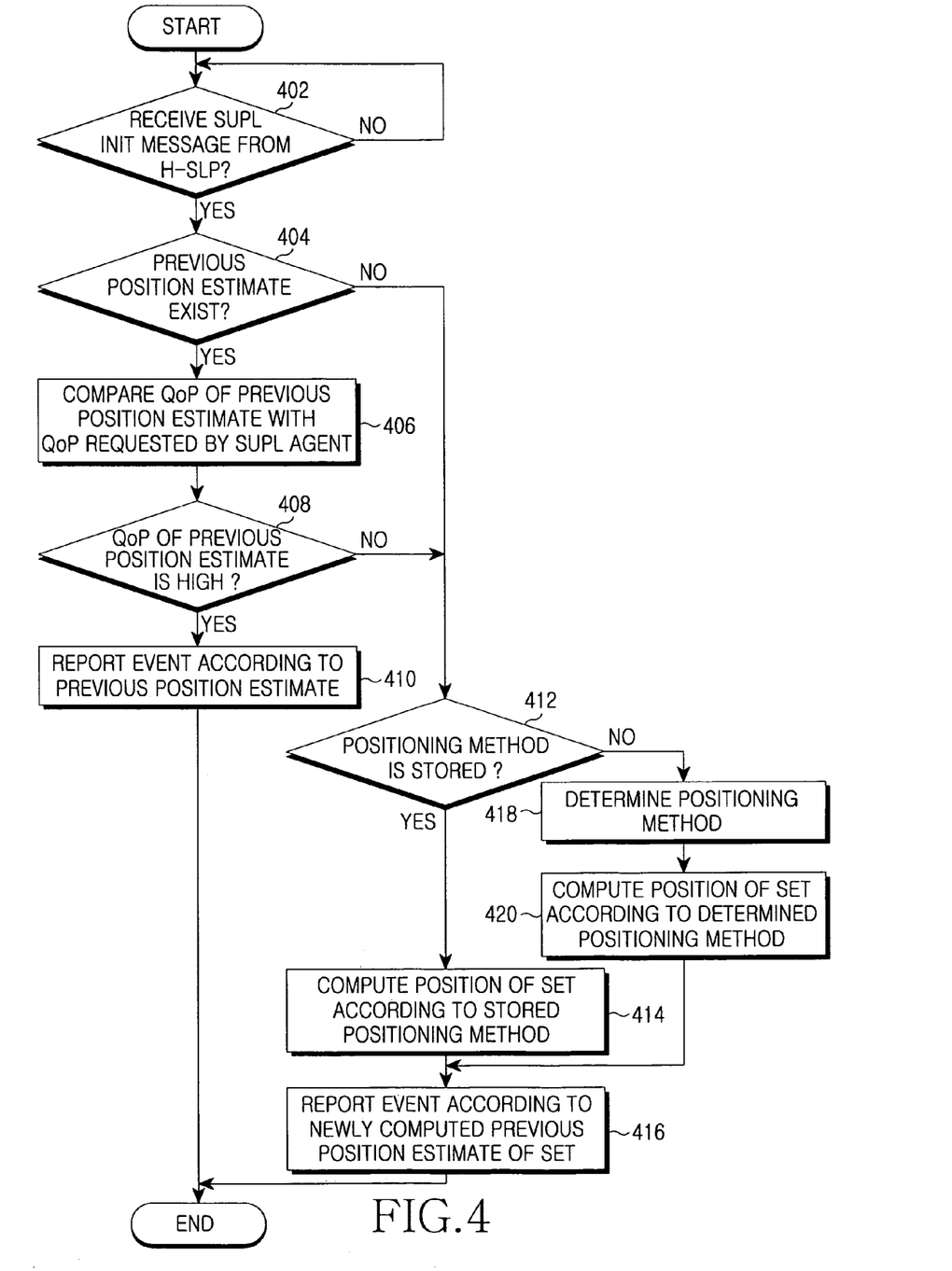
FIG. 4 illustrating the operation of a target SET according to the present invention.

FIGS. 3 and 4 relate to a method by which the H-SLP 200 reports the start of a position tracking service request to the target SET 300, and requests the future location information of a SET (current location information) from the start of the position tracking service request.

The target SET 300 determines the reuse or non-reuse of previous location information by using the criteria including the QoP of the previous location information, etc. When the previous location information can be reused, the target SET 300 regards the previous location information as the current location information, and transmits the previous location information to the H-SLP 200. The H-SLP 200 admits the previous location information transmitted from the target SET 300 as the current location information, and then uses the received location information.

The present invention can be applied to a case in which, if a theft report is received requiring the tracking of a stolen vehicle, the position of the target SET 300 can be tracked from the time point at which the theft report is received. However, since the present invention performs position tracking from the time point at which the theft report is received, position tracking before the theft report is received may be impossible.

Accordingly, the the present invention also enables position tracking to be performed before the time point at which a position tracking service request starts. For example, as described below, if a theft report is received, it is possible to perform position tracking before the theft report is received by using location information.

In order to enable the position tracking before the start time point of the position tracking service request, the H-SLP 200 requests the target SET 300 to provide preceding location information when reporting the start of the position tracking service request. The target SET 300 stores the previous location information during a predetermined time period. If the H-SLP 200 requests location information before the position tracking service request start, the target SET 300 transmits location information satisfying the QoP level or criteria requested by the H-SLP 200. Accordingly, the H-SLP 200 provides the position tracking service from a time point prior to the position tracking service request start by using the location information transmitted from the target SET 300.

Figure 5:
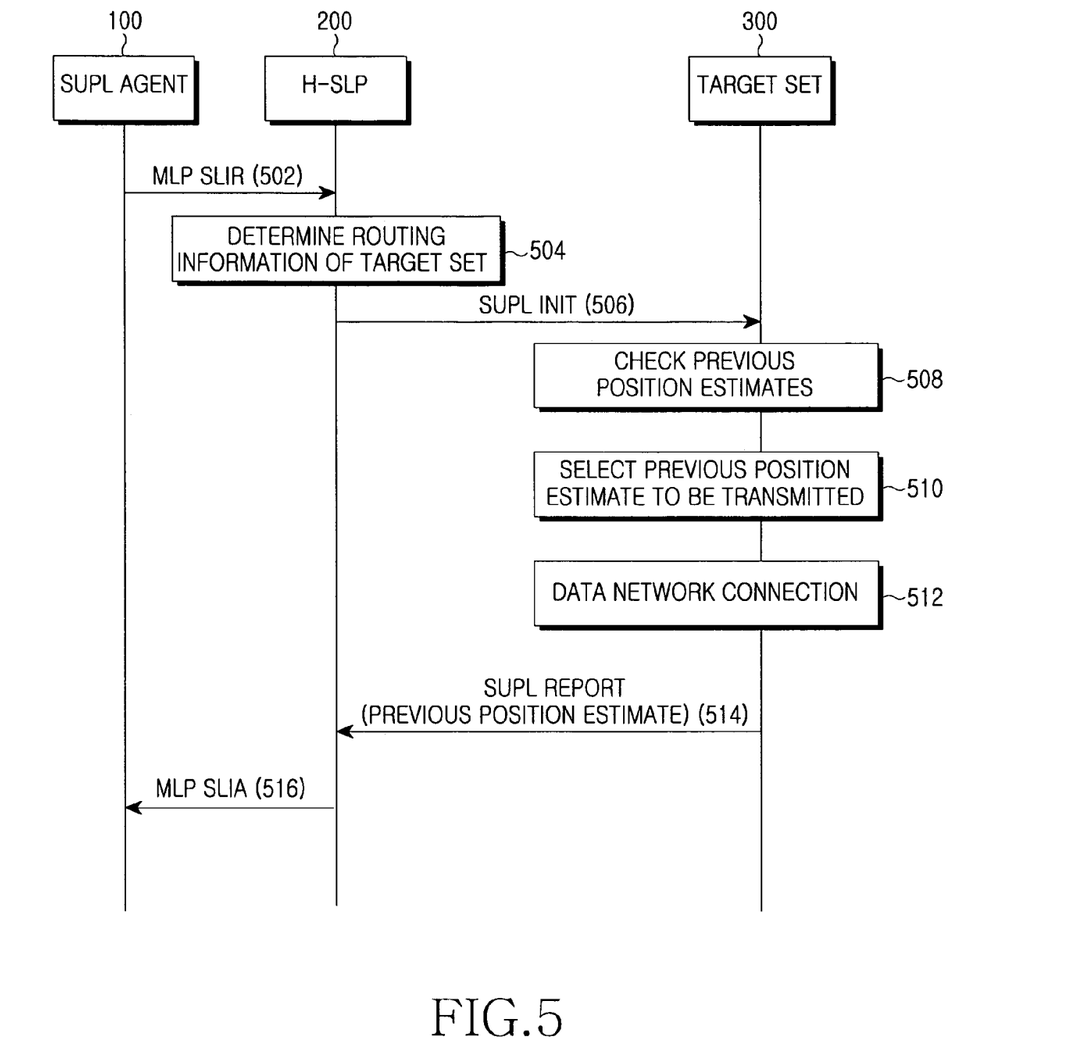
FIG. 5 is a ladder diagram illustrating a method for providing a deferred location request service by using previously computed position estimates in a location service-providing system according to the present invention.

In FIG. 5, a method of using previous location information when an immediate location request service is provided will be described. However, the present invention can be applied to a triggered location request service.

Figure 6:
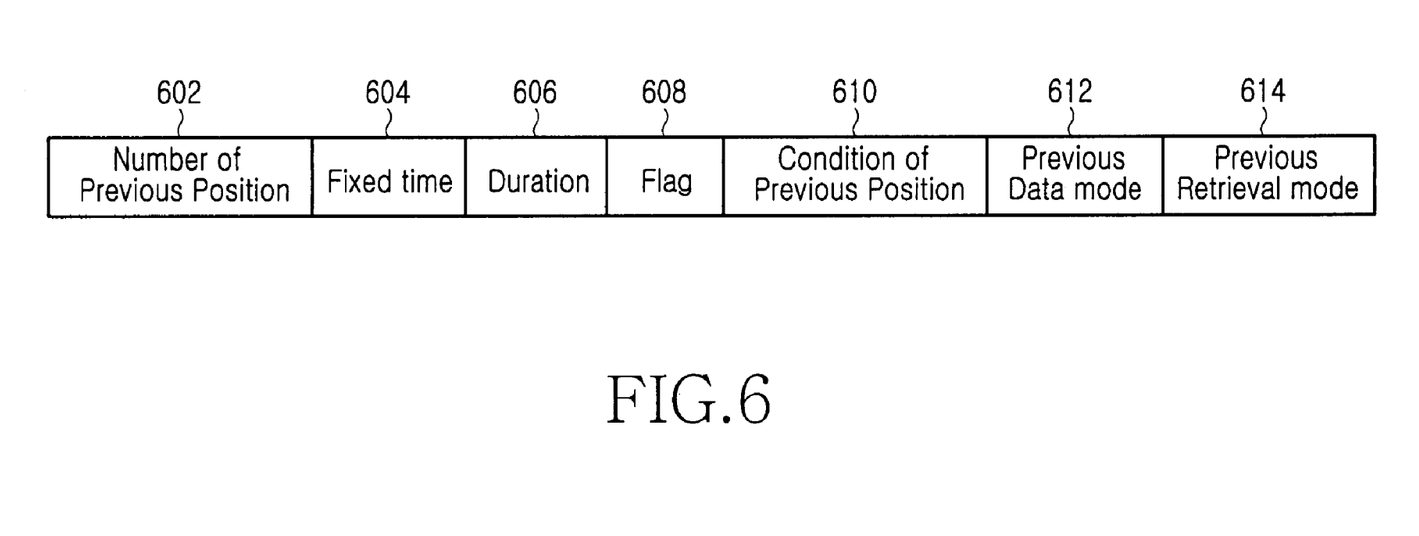
FIG. 6 is a diagram illustrating the structure of a parameter for requesting the transmission of previous location information according to the present invention.

In step 502, the SUPL AGENT 100 transmits a Mobile Location Protocol SUPL Location Immediate Request (MLP SLIR) message to the H-SLP 200. The MLP SLIR message includes a parameter for requesting the transmission of the previous location information. FIG. 6 shows a parameter for requesting the transmission of previous location information. The parameter includes a number of previous position 602, a fixed time 604, a duration 606, a flag 608, a condition of previous position 610, a previous data mode 612, a previous retrieval mode 614, and a condition of previous position.

The number of previous position 602 represents the number of requested previous location information, and the fixed time 604 represents time at which the previous location information (or timing data) had been computed. The duration 606 represents temporal duration or an order of the previous location information, e.g. the first location information and the second location information. Further, the duration 606 represents information regarding when previous location information requested by the H-SLP 200 had been determined. The flag 608 represents the existence or absence of requested previous location information. For example, when there exist criteria for the previous location information, the flag 608 may have a value of 0. Otherwise, the flag 608 may have a value of 1.

The previous data mode represents whether the previous position estimates are requested or the assistant data is requested. This parameter may also be directly transmitted from the SUPL AGENT 100, or may be added when the H-SLP 200 transmits the criteria requested by the SUPL AGENT 100 to the target SET 300.

For example, when the SUPL AGENT 100 has requested the H-SLP 200 to provide previous location information, the H-SLP 200 may transmit a message for requesting the previous location information to the target SET 300. It is possible to indicate whether previous assistant data of a SET is requested or previous location information of a SET are requested by using the previous data mode. The reason by which the H-SLP 200 requests the previous position assistant data is because the H-SLP 200 can compute the previous position estimates of the target SET 300 by using the previous assistant data received from the target SET 300 (e.g. A-GPS SET assisted mode).

The previous retrieval mode represents whether the H-SLP 200 requests the previous position estimates or previous position assistant data of the target SET 300. This previous retrieval mode may express the following four cases: 1. requesting previous position estimates; 2. requesting previous position assistant data; 3. requesting either previous position estimates or previous position assistant data; and 4. requesting both previous position estimates and previous position assistant data.

The current condition of previous position represents criteria for previous location information. The criteria for the previous location information include the QoP, time stamp and time period of the previous location information, a positioning method by which the previous location information has been computed, etc.

The condition of previous position 610 represents criteria for requested previous location information. FIG. 7 shows the condition of previous position 610 in the criteria for previous location information. The condition of previous position 610 includes a max-location-age 702, a horizontal accuracy 704, a vertical accuracy 706, a delay 708, a positioning method 710 (protocols, a positioning method, etc., used for computing location information between a SET and an H-SLP, e.g. a SET-based mode or a SET-assisted mode, examples of a protocol: RRLP, IS-801, etc.), a time stamp 712, and a time limitation or a time period 714. The time stamp 712 represents time at which previous location information or previous assistant data have been generated. The time limitation or the time period 714 represents a period during which previous location information or previous assistant data can be used.

The max-location-age 702 represents the available period of previous location information. The max-location-age is criteria indicating a time period during which the previous location information must be valid starting from its fixed time. The horizontal accuracy 704 and the vertical accuracy 706 represent the accuracy of previous location information, and correspond to information indicating the QoP. The accuracy of the previous location information is criteria indicating how accurate the previous location information must be. The delay 708 represents the delay of the previous location information. The delay of the previous location information is criteria indicating how long the previous location information may be delayed starting from its fixed time.

If the MLP SLIR message including the parameter for requesting the transmission of the previous location information is transmitted from the SUPL AGENT 100 as described above, the H-SLP 200 determines the routing information of the target SET 300 in step 504 of FIG. 5. That is, the H-SLP 200 determines if the target SET 300 is in a roaming state and uses the SUPL. As a result of the determination, the H-SLP 200 determines the routing information. In the present invention, it is assumed that the target SET 300 is not in the roaming state and uses the SUPL.

After determining the routing information, the H-SLP 200 transmits a SUPL INIT message to the target SET 300, thereby allowing the immediate location request service to be initiated, in step 506. When the H-SLP 200 has previous location information and can reuse it, the H-SLP 200 inserts the previous location information into the SUPL INIT message, and transmits the SUPL INIT message. Further, the H-SLP 200 inserts the parameter for requesting the transmission of the previous location information into the SUPL INIT message, and transmits the SUPL INIT message. The transmission of the previous location information has the structures shown in FIGS. 6 and 7.

If the SUPL INIT message is received from the H-SLP 200, the target SET 300 inspects the previous location information in step 508. Herein, the target SET 300 may receive the previous location information from the H-SLP 200 through the SUPL INIT message, or may have the previous location information therein. Accordingly, the target SET 300 determines if the previous location information included in the received SUPL INIT message exist, and determines if the previous location information stored in the target SET 300 exist.

If the previous location information exist, the target SET 300 selects location information satisfying the criteria and QoP of the previous location information to be transmitted to the H-SLP 200 from the previous location information, in step 510.

That is, the target SET 300 compares the QoP which has been requested by the SUPL AGENT 100, with the QoP of the previous location information. When the requested QoP is higher, the target SET 300 selects the previous position estimate or assistant data of the requested QoP. Further, the target SET 300 determines if each of the previous location information satisfies the criteria of previous location information requested by the H-SLP 200. As a result of the determination, the target SET 300 selects an optimal previous position estimate or assistant data. For example, the target SET 300 compares the fixed time of previous location information with the max-location-age of previous location information requested by the H-SLP 200, and selects the most recently computed previous position estimate or assistant data within the max-location-age. The target SET 300 compares the accuracy of previous location information stored therein with the accuracy of previous location information requested by the H-SLP 200, and selects the previous position estimate or assistant data having higher accuracy. Furthermore, the target SET 300 compares information, with regard to how long the fixed time of previous location information stored therein was delayed from the current time point, with the degree of delay allowance of previous location information requested by the H-SLP 200, and selects the previous position estimate or assistant data having the smallest delay.

After selecting the previous position estimate or assistant data to be transmitted as described above, the target SET 300 attempts a data network connection in step 512. That is, the target SET 300 determines if the target SET 300 is being connected to a packet data network. If the target SET 300 is not connected to the packet data network, the target SET 300 attempts the data network connection. The target SET 300 determines a PROXY_MODE or a NON_PROXY_MODE with reference to the parameter SLP_MODE 62 included in the received SUPL INIT message. In the case of the PROXY_MODE, the target SET 300 performs a connection to the H-SLP 200 through an IP.

After performing the connection, the target SET 300 transmits a SUPL REPORT message including previous position estimates to the H-SLP 200 in step 514.

If the SUPL REPORT message is received from the target SET 300, the H-SLP 200 reports the previous location information to the SUPL AGENT 100 by using an MLP SLIA message in step 516.

Figure 8:
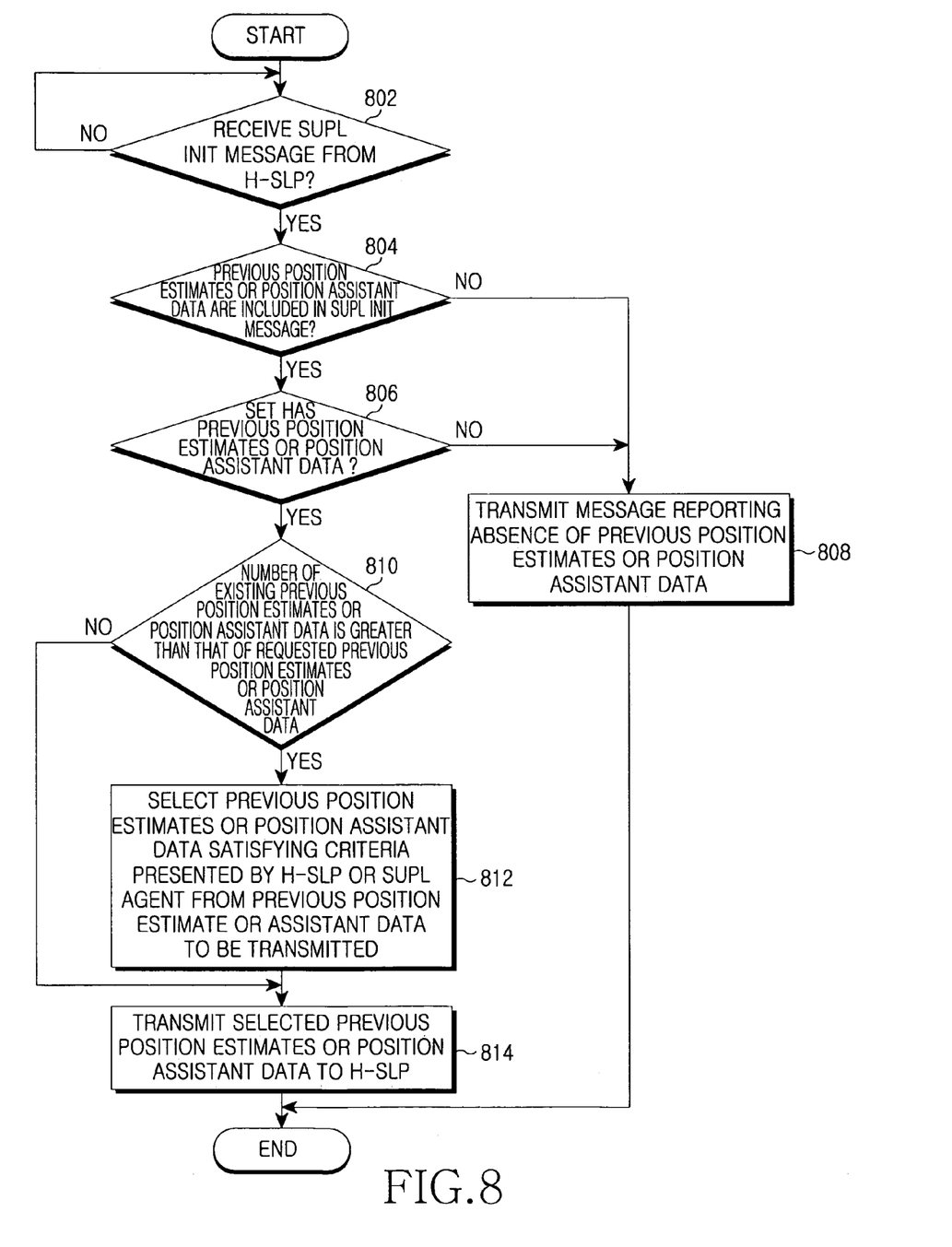
FIG. 8 is a flow diagram illustrating the operation of a target SET according to the present invention.

Hereinafter, the operation of the target SET 300 when the H-SLP 200 has requested previous location information as described above will be described in more detail. FIG. 8 shows the operation of the target SET 300 according to the present invention.

In step 802, the target SET 300 determines if the SUPL INIT message is received from the H-SLP 200. The SUPL INIT message may include previous location information. Further, the SUPL INIT message may include the number of previous location information, and the QoP of previous location information to be transmitted. Furthermore, the SUPL INIT message may include the maximum location age of previous location information to be transmitted, the horizontal accuracy and vertical accuracy of previous location information, the fixed time of location information, the delay of previous position estimates or assistant data, etc. The maximum location age of the previous location information is criteria indicating the time period during which the previous location information must be valid starting from its fixed time. The horizontal accuracy and the vertical accuracy are criteria indicating how accurate the previous location information must be. The fixed time is criteria indicating the time point at which location information had been computed. The delay of the previous location information is criteria indicating how long the previous location information may be delayed starting from its fixed time. Further, positioning methods used when the set and the H-SLP compute location information are utilized as criteria as illustrated in FIGS. 6 and 7.

If the SUPL INIT message is received from the H-SLP 200, the target SET 300 determines if previous location information are included in the SUPL INIT message in step 804. Herein, the target SET 300 may receive the previous location information from the H-SLP 200 through the SUPL INIT message, or may have the previous location information therein. Accordingly, the target SET 300 determines if the previous location information included in the received SUPL INIT message exist, and determines if the previous location information stored in the target SET 300 exist.

If the previous location information do not exist, the target SET 300 sends a message reporting the absence of the previous location information to the H-SLP 200 in step 808. However, if the previous location information exist, the target SET 300 determines if the number of the existing previous location information is greater than that of the requested previous location information in step 810. If so, the target SET 300 must select previous location information requested by the H-SLP 200 from the multiple previous location information.

Accordingly, if the number of the existing previous location information is greater than that of the requested previous location information, the target SET 300 selects previous location information, which satisfy the condition of previous position including the criteria and QoP of the previous location information requested by the H-SLP 200, from the previous location information stored in the target SET 300, in step 812.

Herein, the target SET 300 compares the criteria and QoP of the previous location information stored therein with the condition of previous position including both the criteria of previous location information requested by the H-SLP 200 and the QoP of previous location information to be transmitted. As a result of the comparison, the target SET 300 selects an optimal location information.

For example, the target SET 300 compares the fixed time of previous location information stored therein with the maximum location age of previous location information requested by the H-SLP 200, and selects the most recently computed previous location information within the maximum location age. Further, the target SET 300 compares the accuracy of previous location information stored therein with the accuracy of previous location information requested by the H-SLP 200, and selects the previous location information having higher accuracy. Furthermore, the target SET 300 compares information, with regard to how long the fixed time of previous location information stored therein was delayed from the current time point, with the degree of delay allowance of previous location information requested by the H-SLP 200, and selects the previous location information having the smallest delay.

After selecting the optimal previous location information as described above, the target SET 300 transmits the selected previous location information to the H-SLP 200 in step 814. Consequently, the H-SLP 200 can provide the position tracking service before the position tracking service request start. For example, if a theft report is received, the H-SLP 200 causes position tracking to be performed before the theft report is received by using location information prior to the theft report.

As described above, when the previously computed previous location information of a target SET exist in a SET or an H-SLP, a location request service is provided by reusing the existing previous location information. Consequently, according to the present invention, when a location request service is provided, it is possible to eliminate an unnecessary positioning procedure by using the previous location information, and to obtain the past position estimates.

Further, according to the present invention, it is possible to perform a process for determining through only a one-time positioning procedure if an event has occurred and reporting the occurrence of an event, which, otherwise, must be performed several times, so that a deferred location request service can be efficiently provided.

Furthermore, according to the present invention, it is possible to provide a location service for a position prior to the time point, at which a position service request starts, by using previous location information. For example, if a theft report is received, it is possible to perform position tracking before the theft report is received by using location information prior to the theft report.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A Home-Secure User Plane Location (SUPL) Location Platform (H-SLP) for providing a location service, the H-SLP comprising:
   a processing module for receiving a location service request from a SUPL Agent, transmitting a message including a condition of previous position to a target SUPL Enabled Terminal (SET) according to the location service request, receiving location information from the target SET, and providing the received location information to the SUPL Agent; and
   a memory module for storing the received location information and a condition of position corresponding the received location information;
   wherein the condition of previous position represents conditions for previous position estimates or position assistant data.

2. The H-SLP as claimed in claim 1, wherein the processing module inserts the condition of previous position of the location information included in the message and transmits the message.

3. The H-SLP as claimed in claim 1, wherein the condition of previous position is provided by one of the H-SLP and the SUPL Agent.

4. The H-SLP as claimed in claim 1, wherein the location service request includes location information, a Quality of Position (QoP) of location information requested by the SUPL Agent, and criteria for the location information, the location information including at least one of a previous position estimate and previous assistant data.

5. The H-SLP as claimed in claim 1, wherein the processing module for transmitting the message performs an operation of determining whether the previously stored location information exists and transmitting the message including at least one of condition of previous position of the location information and the previously stored location information.

6. The H-SLP as claimed in claim 1, wherein the condition of the previous position is provided from the SUPL Agent to the H-SLP through a message in connection with the location service request.

7. A target SUPL Enabled Terminal (SET) for providing a location service, the target SUPL comprising:
   a processing module for receiving a message including a condition of previous position according to a location service request from a Home-Secure User Plane Location (SUPL) Location Platform (H-SLP), determining whether previously stored location information satisfying the condition of previous position in the message exists, determining position information by reusing the previously stored location information when the previously stored location information satisfying the condition of previous position in the message exists, and providing the H-SLP with the position information; and
   a memory module for storing the determined location information and a condition of position corresponding the location information;
   wherein the condition of previous position represents conditions for previous position estimates or position assistant data.

8. The target SET as claimed in claim 7, wherein the processing module performs new positioning and provides the location service when the previously stored location information satisfying the condition of previous position in the message does not exist.

9. The target SET as claimed in claim 7, wherein the processing module selects one of condition of previous position of the location information included in the message received from the H-SLP and condition of previous position of the previously stored location information, compares the condition of previous position the selected previous location information with condition of previous position requested by a Secure User Plane Location (SUPL) Agent, and determines reuse or non-reuse of the location information.

10. The target SET as claimed in claim 7, wherein the processing module selects one of condition of previous position of the location information included in the message received from the H-SLP and condition of previous position of the previously stored location information, compares the selected condition of previous position with condition of previous position owned by the H-SLP, and determines reuse or non-reuse of the location information.

11. The target SET as claimed in claim 7, wherein the processing module compares a Quality of Position (QoP) of the location information of the H-SLP with a QoP of the previously stored location information, and selects location information having a high QoP level when the condition of previous position is QoP.

12. A method for providing a location service by Home-Secure User Plane Location (SUPL) Location Platform (H-SLP), the method comprising:
   receiving a location service request from a SUPL Agent;
   transmitting a message including a condition of previous position to a target SUPL Enabled Terminal (SET) according to the location service request;
   receiving location information from the target SET;
   providing the received location information to the SUPL Agent; and
   storing the received location information and a condition of position corresponding the location information;
   wherein the condition of previous position represents conditions for previous position estimates or previous position assistant data of the target SET.

13. The method as claimed in claim 12, wherein the step of transmitting the message comprises:
   inserting the condition of previous position of the location information included in the message; and
   transmits the message.

14. The method as claimed in claim 12, wherein the location service request includes location information, a Quality of Position (QoP) of location information requested by the SUPL Agent, and criteria for the location information, the location information including at least one of a previous position estimate and previous assistant data.

15. The method as claimed in claim 12, wherein the step of transmitting the message comprises:
   determining whether the previously stored location information exists; and
   transmitting the message including at least one of condition of previous position of the location information and the previously stored location information.

16. The method as claimed in claim 12, wherein the step of receiving a location service request comprises receiving the condition of the previous position provided from the SUPL Agent through a message in connection with the location service request.

17. A method for providing a location service by a target Home-Secure User Plane Location (SUPL) Enabled Terminal (SET), the method comprising:
   receiving a message including a condition of previous position according to a location service request from an SUPL Location Platform (H-SLP);

determining whether previously stored location information satisfying the condition of previous position in the message exists;

determining position information by reusing the previously stored location information when the previously stored location information satisfying the condition of previous position in the message exists;

providing the H-SLP with the position information; and storing the determined location information and a condition of position corresponding the location information;

wherein the condition of previous position represents conditions for previous position estimates or previous position assistant data of the target SET.

18. The method as claimed in claim 17, wherein the step of determining whether previously stored location information satisfying the condition of previous position in the message exists comprises:

selecting one of condition of previous position of the location information included in the message and condition of previous position of the previously stored location information;

comparing the selected condition of previous position with condition of previous position owned by the target SET; and determining reuse or non-reuse of the location information.

19. The method as claimed in claim 18, wherein the selecting step comprises:

comparing a Quality of Position (QoP) of the location information included in the message with the QoP of the previously stored location information in the target SET; and selecting location information having a high QoP level when the condition of previous position is QoP.

20. The method as claimed in claim 17, wherein the step of determining whether previously stored location information satisfying the condition of previous position in the message exists comprises:

selecting one of condition of previous position of the location information included in the message and condition of previous position of the previous previously stored location information; and comparing the condition of previous position of the selected previous location information with the condition of previous position requested by the SUPL Agent; and determining reuse or non-reuse of the location information.

21. The method as claimed in claim 20, wherein the selecting step comprises:

comparing a Quality of Position (QoP) of the location information included in the SUPL INIT message with the QoP of the previously stored location information in the target SET; and selecting location information having a high QoP level when the condition of previous position is QoP.

22. The method as claimed in claim 17, wherein the step of determining whether previously stored location information satisfying the condition of previous position in the message exists comprises:

selecting by the target SET one of condition of previous position of the location information included in the message and condition of previous position of the previously stored location information; and comparing by the target SET the condition of previous position of the selected location information with the condition of previous position owned by the H-SLP; and determining reuse or non-reuse of the location information.

23. The method as claimed in claim 22, wherein the selecting step comprises:

comparing a Quality of Position (QoP) of the location information included in the SUPL INIT message with the QoP of the previously stored location information in the target SET; and selecting previous location information having a high QoP level when the condition of previous position is QoP.

24. The H-SLP as claimed in claim 1, wherein the condition of previous position comprises at least one of an accuracy, a time stamp, a time period, and a position method used for computing position estimates or position assistant data.

25. The target SET as claimed in claim 7, wherein the condition of previous position comprises at least one of an accuracy, a time stamp, a time period and a position method used for computing position estimates or position assistant data.

26. The H-SLP as claimed in claim 12, wherein the condition of previous position comprises at least one of an accuracy, a time stamp, a time period and a position method used for computing position estimates or position assistant data.

27. The H-SLP as claimed in claim 17, wherein the condition of previous position comprises at least one of an accuracy, a time stamp, a time period and a position method used for computing position estimates or position assistant data.

* * * * *